United States Patent [19]

Washburn

[11] 4,359,285

[45] Nov. 16, 1982

[54] TEMPERATURE MEASUREMENT SYSTEM

[75] Inventor: Ralph G. Washburn, Marion, Mass.

[73] Assignee: The Sippican Corporation, Marion, Mass.

[21] Appl. No.: 140,800

[22] Filed: Apr. 16, 1980

[51] Int. Cl.³ .............................. G01D 3/04; G01K 1/20
[52] U.S. Cl. ................................. 374/172; 73/170 A; 331/66; 374/136
[58] Field of Search ............ 73/362 AR, 170 A, 343.5, 73/344, 362.4; 331/66; 340/861; 307/310; 367/81

[56] References Cited

U.S. PATENT DOCUMENTS

| | | | |
|---|---|---|---|
| 3,157,843 | 11/1964 | Koncen | 331/66 X |
| 3,221,566 | 12/1965 | Campbell et al. | 73/362 A |
| 3,371,312 | 2/1968 | Hopkinson | 340/861 |
| 3,378,829 | 4/1968 | Alafi et al. | 331/66 |
| 3,397,573 | 8/1968 | Carter | 73/170 A |
| 3,410,136 | 11/1968 | Johns et al. | 73/154 |
| 3,417,619 | 12/1968 | Francis | 73/362 A |
| 3,675,484 | 7/1972 | Pederson | 73/362 A |
| 3,748,899 | 7/1973 | Gregg | 73/170 A |
| 3,831,450 | 8/1974 | Schipke et al. | 73/344 |
| 3,860,863 | 1/1975 | Lamprecht | 331/66 |
| 3,882,481 | 5/1975 | Turner | 73/344 X |
| 3,906,391 | 9/1975 | Murdock | 331/66 |
| 3,975,649 | 8/1976 | Kawagoe | 331/176 |
| 4,025,847 | 5/1977 | Washburn | 73/362 A X |
| 4,068,138 | 1/1978 | Miyakawa et al. | 73/362 A X |
| 4,109,527 | 8/1978 | Goode, Jr. | 73/344 X |
| 4,157,657 | 6/1979 | Hinchman | 73/344 |

FOREIGN PATENT DOCUMENTS

| | | | |
|---|---|---|---|
| 835095 | 5/1960 | United Kingdom | 73/362 SC |
| 1024823 | 4/1966 | United Kingdom | 73/362 R |

Primary Examiner—Daniel M. Yasich

[57] ABSTRACT

In a temperature probe having a thermistor controlling the output frequency of an oscillator to effect a temperature-frequency conversion, and a remote measuring station having a frequency detection means, the invention features, generally, a switch in the probe connected to a detection circuit, the oscillator being connected to the switch so as to open and close the circuit in response to the oscillator output frequency.

12 Claims, 1 Drawing Figure

TEMPERATURE MEASUREMENT SYSTEM

BACKGROUND OF THE INVENTION

This invention relates to temperature probes having a thermistor responsive to the temperature to be measured which controls the output frequency of an oscillator to effect a temperature-frequency conversion. The invention is particularly applicable to oceanography systems in which the probe output is transmitted to a surface measuring station.

In some such systems, the oscillator in the probe is powered from a surface power source, and the probe output is transmitted to a surface detector. Because it is desirable to minimize probe size and cost, particularly where the probe is to be expendable, it is desirable to minimize the size of the cables transmitting power to and output from the probe. Smaller cable also increases the potential probe depth by allowing more cable to be packaged in the same volume. However, large cables and powerful oscillator outputs are ordinarily necessary to ensure a measurable signal at the surface station.

SUMMARY OF THE INVENTION

This invention features, generally, a switch in the probe connected to a detection circuit; the oscillator is connected to the switch so as to open and close the circuit in response to the oscillator output frequency; the system includes means for providing power to the oscillator and to the detection circuit, and a frequency detection means at a remote measuring station to sense the opening and closing of the circuit.

In preferred embodiments, a single DC source at the measuring station powers both the oscillator and the detection circuit; wire connecting the probe components to the measuring station components is at least 2,500 feet and up to 10,000 or more feet long and finer than 38 gauge; the switch is a transistor; the oscillator is a multivibrator of the cos/mos type connected to a cos/mos divider; the gain factor of the transistor is at least 100; and the oscillator consumes less than 10 milliwatts.

DESCRIPTION OF THE PREFERRED EMBODIMENT

Figure 1:
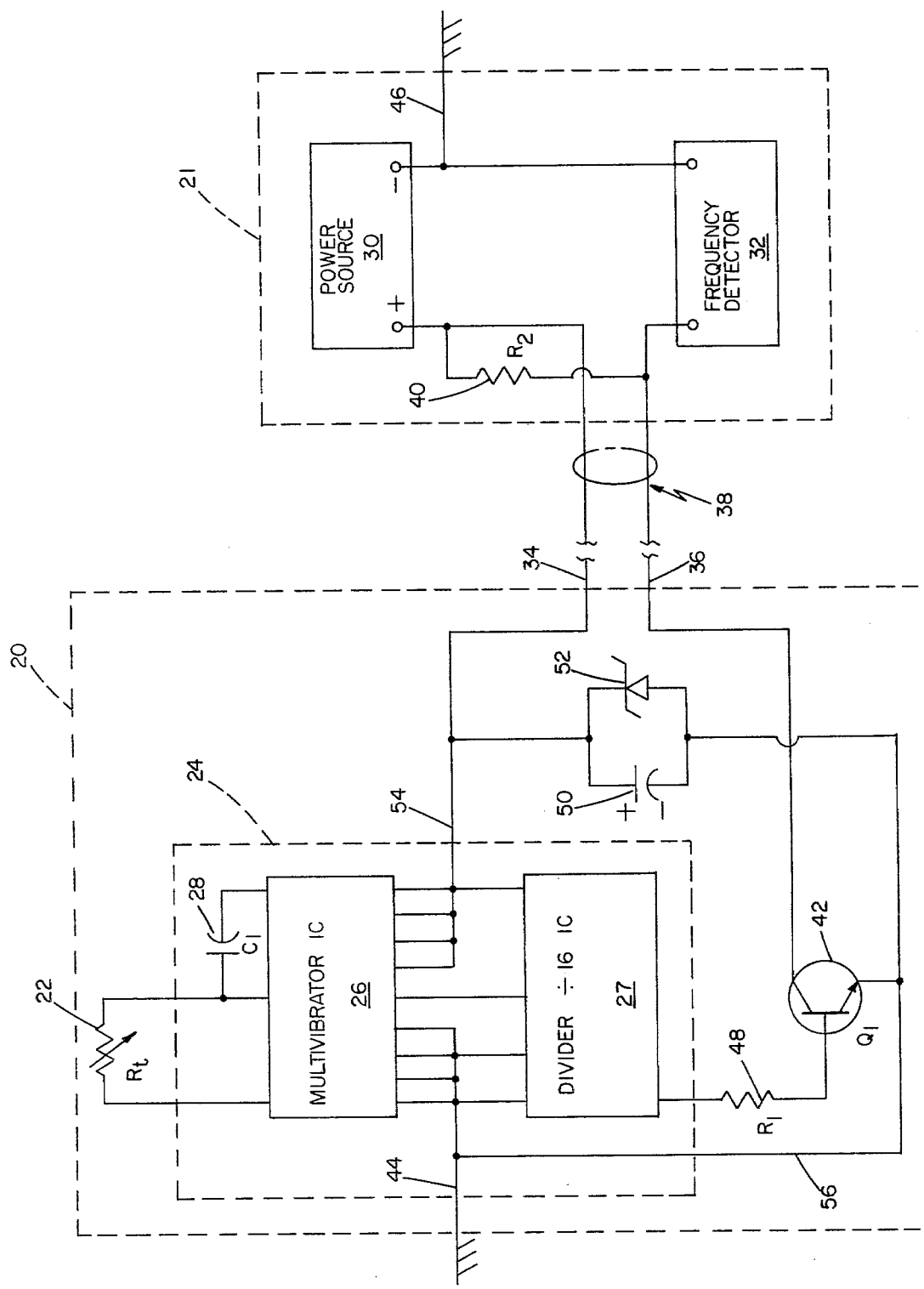
FIG. 1 is a schematic diagram of the circuitry of the invention in a probe and accompanying measuring station.

FIG. 1 schematically shows bathythermograph probe 20 connected to 39 gauge copper wires 34 and 36 of long (over 2,500 feet) twin-wire insulated cable 38 which extends between the probe and a measuring station 21 (e.g., a ship). The overall system may be of the sort described in U.S. Pat. No. 3,221,556, e.g., and would in that case include suitable spooling apparatus in the probe and at station 21 to enable deployment of the probe from a moving ship; such a system, using sea electrodes 44 and 46 and a seawater return path to complete the circuits to the probe, is just one of many measurement systems in which the invention can be advantageously embodied.

CIRCUITRY

At measuring station 21, wire 36 is connected to the positive terminal of a 28 volt DC power source 30 through dropping resistor 40 to form a detection circuit through high gain transistor 42 in probe 20, the circuit being completed via seawater grounds 44 and 46 to the negative terminal of power source 30. Frequency detector 32 is connected across the circuit to sense the frequency of the voltage drops caused when transistor 42 repeatedly closes the circuit.

In probe 20, the base of transistor switch 42 is connected through resistor 48 to the output of square wave oscillator 24, which includes multivibrator integrated circuit 26 and divider integrated circuit 27. The output frequency of multivibrator 26 is controlled by thermistor 22 and capacitor 28.

Power for oscillator 24 is supplied from power source 30 through magnet wire (or other insulated wire) 34, which is connected at station 21 to the positive terminal of source 30 and, in probe 20, to lead 54 and to the positive leads of parallel capacitor 50 and zener diode 52. The negative leads of capacitor 50 and zener diode 52 are connected to oscillator lead 56 and to seawater ground 44. The circuit is completed via seawater ground 46 to the negative terminal of power source 30.

Components used in the preferred embodiment are:

$R_t22$ . . . ranges from 18,094 ohms at $-2°$ C. to 3263 ohms at 35° C.
Multivibrator 26 . . . a 4047 cos/mos low-power, astable, multivibrator.
Divider 27 . . . a 4024 cos/mos divider, dividing frequency by a factor of 16.
Frequency Detector 32. LM 306
$R_148$ . . . 100,000 ohms
$R_240$ . . . 1,000 ohms
capacitor 28 . . . 0.0086 $\mu f$
capacitor 50 . . . 5.6 $\mu f$
transistor 42 . . . MPS 5172
wires 34 and 36 . . . AWG 39 magnet wire
zener diode 52 . . . CR1 IN5240 10 Vz

OPERATION

Because the output frequency of multivibrator 26 depends inversely on the resistance of thermistor 22, and the resistance of thermistor 22 depends inversely on its temperature, a temperature-frequency conversion is effected by the circuitry described. Specifically, multivibrator 26 and divider 27, using complementary-symmetry/metal-oxide-semiconductor (cos/mos) technology, have proved to possess the requisite frequency stability over time and over a wide range of temperatures. The output frequency $F_m = 1/4.4\ R_t C_1$, where $R_t$ is the resistance of thermistor 22 and $C_1$ is the capacitance of capacitor 28. It is desirable to keep the size and therefore the capacitance of capacitor 28 small, its value in the preferred embodiment being 0.0086 $\mu f$, yielding $F_m = 1460$ Hz at $-2°$ C. and 8099 Hz at 35° C. To reduce attenuation in long magnet wire 36, the output frequency of multivibrator 26 is reduced by a factor of 16 using cos/mos divider 27, yielding a value for $F_o$, the output frequency of oscillator 24, of 91.25 Hz at $-2°$ C. and 506.2 Hz at 35° C.

This output is connected to the base of transistor 42, causing it to open and close the detection circuit at the rate $F_Q = 1/16(4.4\ R_t C_1)$. At station 21, frequency detector 32 senses the frequency of the voltage drops when the circuit is repeatedly closed and thus provides a means of remote detection of the output frequency of oscillator 24 and therefore the temperature of thermistor 22.

Advantageously, oscillator 24 need only produce an output powerful enough to operate transistor switch 42, and thus consumes relatively little power, e.g., less than 10 milliwatts, and avoids the need for heavy gauge wires capable of powering the oscillator and of transmitting the oscillator output of the remote measuring station with enough energy to permit a frequency measurement.

Other Embodiments

Other embodiments are within the following claims. For example, the invention is useful where parameters other than temperature are converted to frequency for measurement. Land and sea surface stations can be used in connection with a sea probe. The size of the wires to the probe can be reduced depending on the wire length and on physical strength requirements to, e.g., 40 gauge. Heavier gauge, e.g., 34 gauge, can also be used depending on such requirements. The length of the wires can be considerably larger than 2,500 feet, e.g., up to at least 10,000 feet. The gain factor of the transistor switch can vary, and is preferably greater than 100.

I claim:
1. A system for remote measurement of a physical parameter comprising:
   a measuring station,
   a portable probe adapted to be deployed remotely from said measuring station,
   a power circuit connected between said probe and said measuring station,
   a detection circuit connected between said measuring station and said probe,
   said power circuit and said detection circuit having at least one wire at least 2500 feet long connecting said probe to said measuring station,
   said measuring station having
      a power source connected in said power circuit and in said detection circuit, and
      detecting means connected in said detection circuit for determining whether said detection circuit is open or closed,
   said probe having
      an element for sensing said parameter,
      a variable frequency oscillator connectod to said power circuit and to said element to provide an alternating current output at a frequency dependent upon the condition of said element, and
      switch means connected in said detection circuit and to said oscillator to open and close at a rate dependent upon said frequency so that said parameter can be effectively measured at said measuring station without transmission of said alternating current output over said detection circuit.
2. The system of claim 1 wherein said wire is finer than 38 gauge.
3. The system of claim 1 wherein said oscillator consumes less than 10 milliwatts.
4. The system of claim 1 wherein said oscillator includes a low-power multivibrator of the cos/mos type.
5. The system of claim 4 wherein the output of said multivibrator is connected to a cos/mos divider, and the output of said divider is connected to the base of said transistor.
6. The system of claim 1 wherein said switch means is a transistor, said alternating current output being connected to the base of said transistor.
7. The system of claim 6 wherein said transistor has a gain factor of at least 100.
8. The system of claim 6 wherein said connection between said alternating current output and the base of said transistor includes a first resistor.
9. The system of claim 6 wherein said power source is a DC power source and wherein there are two said wires, one said wire connecting a first input of said oscillator to the positive terminal of said DC power source and a second said wire connecting the collector of said transistor to said positive terminal, and wherein a second input of said oscillator and the emitter of said transistor are connected to a first seawater ground in said probe, and the negative terminal of said DC power source is connected to a second seawater ground at said measuring station.
10. The system of claim 9 wherein said connection between said positive terminal and said collector of said transistor includes a second resistor.
11. The system of claim 9 wherein said first input of said oscillator is also connected to the positive lead of a capacitor and to the positive lead of a zener diode, and said second input of said oscillator is also connected to the negative lead of said capacitor and the negative lead of said zener diode.
12. The system of claim 9 wherein a first frequency detector lead is connected to said collector of said transistor and a second frequency detector lead is connected to said second seawater ground.

* * * * *